May 20, 1958  R. S. KARINEN  2,834,963
ADJUSTABLE ANVIL CARRIAGE
Filed Feb. 21, 1956  4 Sheets-Sheet 1

INVENTOR.
RAYMOND S. KARINEN
BY
William C. Babcock
ATTORNEY

May 20, 1958  R. S. KARINEN  2,834,963
ADJUSTABLE ANVIL CARRIAGE
Filed Feb. 21, 1956  4 Sheets-Sheet 2

INVENTOR.
RAYMOND S. KARINEN
BY
William C. Babcock
ATTORNEY

May 20, 1958 R. S. KARINEN 2,834,963
ADJUSTABLE ANVIL CARRIAGE
Filed Feb. 21, 1956 4 Sheets-Sheet 3

INVENTOR.
RAYMOND S. KARINEN
BY
William C. Babcock
ATTORNEY

May 20, 1958  R. S. KARINEN  2,834,963
ADJUSTABLE ANVIL CARRIAGE
Filed Feb. 21, 1956  4 Sheets-Sheet 4

INVENTOR.
RAYMOND S. KARINEN
BY
William C. Babcock
ATTORNEY

United States Patent Office 2,834,963
Patented May 20, 1958

2,834,963

ADJUSTABLE ANVIL CARRIAGE

Raymond S. Karinen, St. Paul, Minn., assignor to General Mills, Inc., a corporation of Delaware Application February 21, 1956, Serial No. 566,788

4 Claims. (Cl. 1—2)

This invention relates to component forming and inserting machines for the assembly of electrical components, and more particularly to an adjustable anvil carriage assembly for such machines.

One object of the invention is the provision of an anvil carriage assembly which may be readily adjusted to accommodate different types and sizes of components.

Another object is an adjustable anvil carriage assembly in which the relative spacing of the anvil members can be changed to obtain different desired configurations for the component leads.

A further object is an anvil carriage assembly having a main body portion or block with readily removable anvil components thereon.

Other objects and advantages of the invention will be apparent from the following specification in which certain preferred embodiments are described with particular reference to the accompanying drawings.

Figure 1:
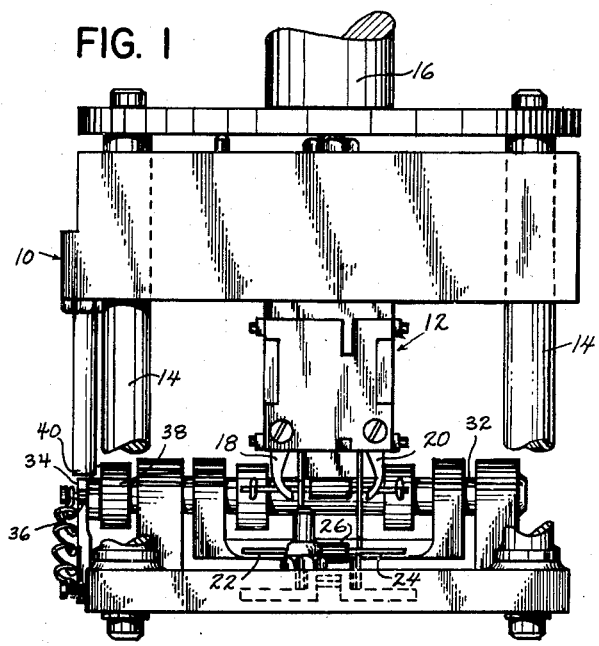
Figure 1 is a partial front elevation of the component forming and inserting machine embodying features of the present invention, with the forming head in retracted position.

As shown in Figs. 1 to 4, the component forming and inserting machine is designated generally at 10. It includes a forming head 12 which moves vertically on guides 14 under the influence of power means such as an air cylinder 16. The forming head includes bending fingers 18 and 20 adapted to engage and bend the projecting wire leads 22 and 24 of a suitable electrical component 26. This component may be an electrical resistor, condenser, or other appropriate unit.

The component is fed from a suitable supply means to a component receiving and supporting anvil assembly designated generally at 28. This anvil carriage assembly supports the component while the bending fingers 18 and 20 shape the leads in the desired fashion as shown in Fig. 5. The anvil is then adapted to be retracted out of the path of the forming head as shown in Fig. 4 when the forming head moves the component to insert it in a printed circuit board 42.

Figure 2:
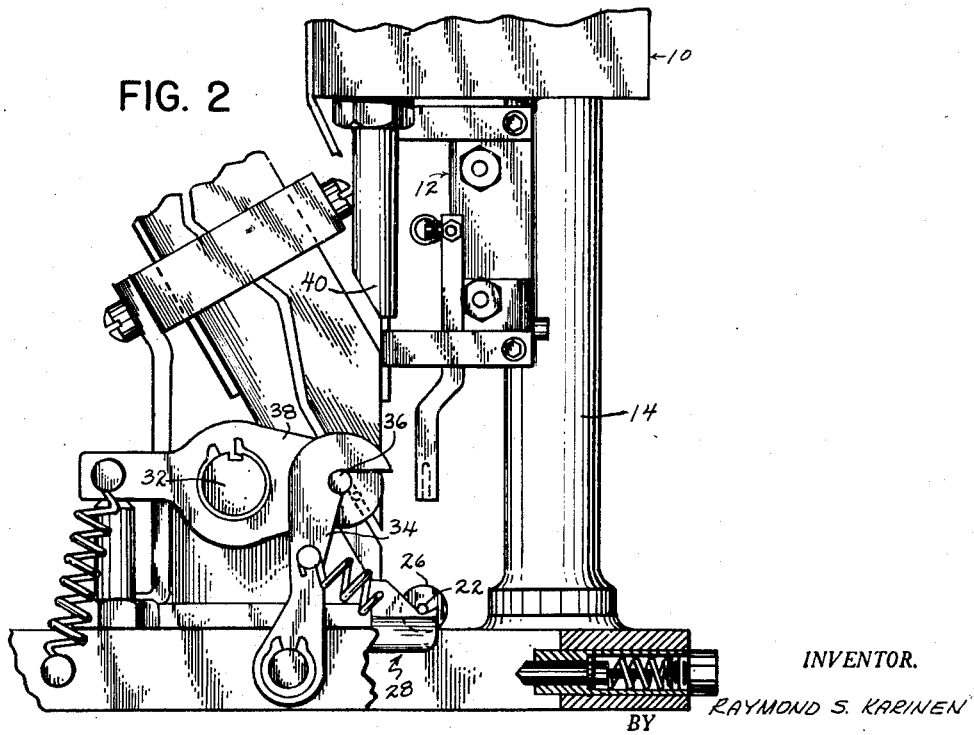
Fig. 2 is a partial side view of the device of Fig. 1.
Figure 3:
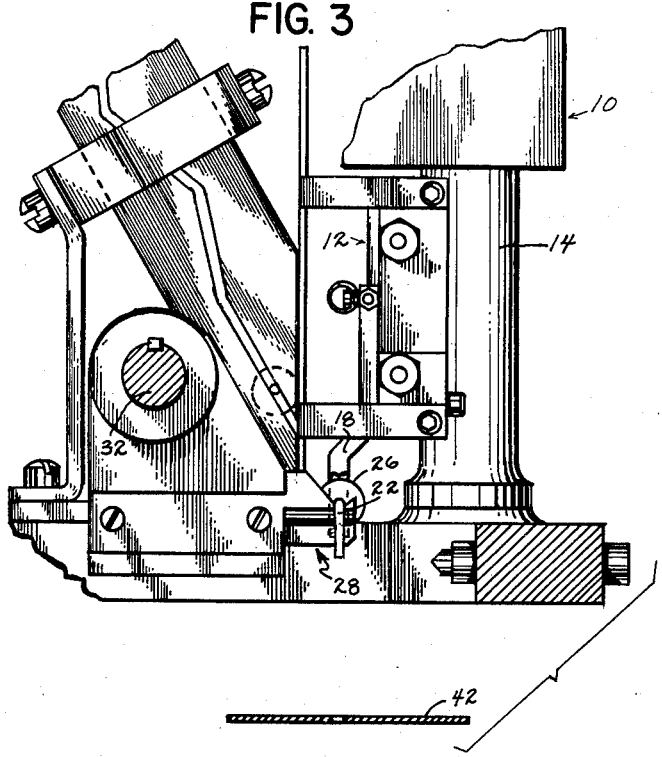
Fig. 3 is a view similar to Fig. 2 showing the forming head in its lead bending position.
Figure 4:
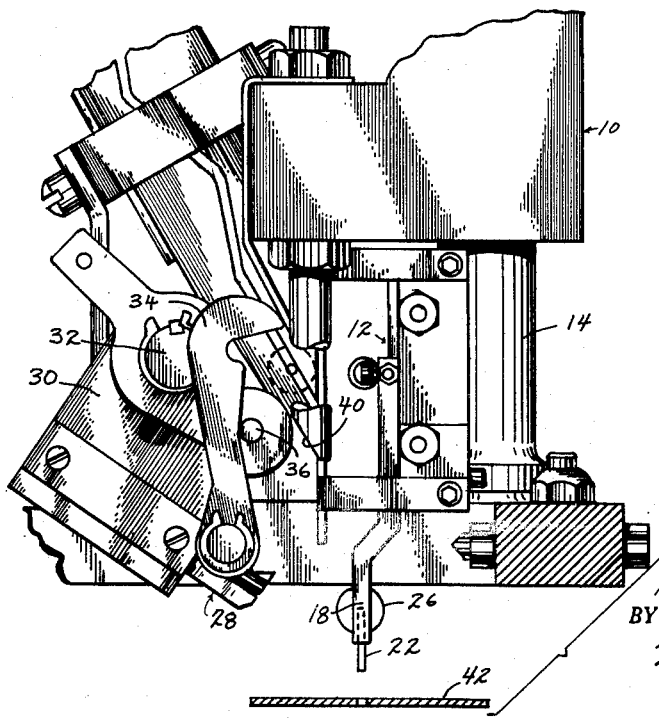
Fig. 4 is a similar view showing the forming head carrying the component toward its inserted position.
Figure 5:
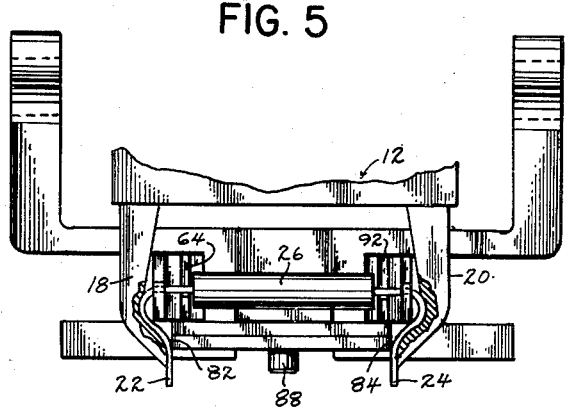
Fig. 5 is an enlarged partial view of the adjustable anvil carriage of the preceding figures, showing how the bending fingers of the forming head shape the component leads against the anvil.

The anvil carriage includes a body portion 30 secured to a cross shaft 32 for rotation between the component receiving and supporting position of Figs. 1–3 and the displaced position of Fig. 4.

The anvil assembly is normally held in supporting position by a pivoted latch 34 which engages a pin 36 on a lever arm 38 keyed to shaft 32. A cam surface 40 on the forming head is adapted to engage the latch 34 and move it to releasing position. Member 40 also engages and moves lever arm 38 to swing the anvil to the displaced position of Fig. 4 after the leads are bent. Return springs restore the anvil assembly and latch to the position of Fig. 3 when the forming head is retracted.

The details of this forming head and associated mechanism do not constitute part of the present invention and need not be further described herein. Some of the features disclosed but not claimed herein are, however, fully described and claimed in the copending application of Charles H. Bergsland et al., Serial No. 488,232, filed February 15, 1955, and assigned to the same assignee of the present invention.

The adjustable anvil carriage assembly of the present invention is more fully shown in Figs. 5, 6, and 8–10. As indicated above, the anvil includes a body portion 30 secured to the rotary anvil shaft 32. Between the body portions 30 which are attached to this shaft, the main body portion of the anvil consists of a block 44. This block includes side recesses 46 and 48 adapted to receive side anvil units 50 and 52, respectively. The presence of these side recesses 46 and 48 effectively gives the block 44 an I-shaped cross section. This anvil carriage body or block portion has an upwardly extending recess 54 in its lower surface to receive a removable wire guide assembly 56 as described below.

Figure 9:
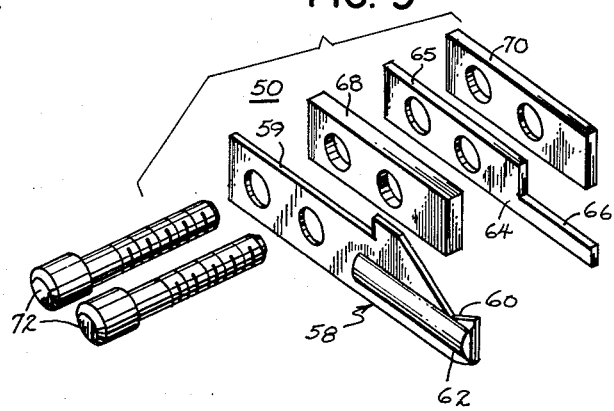
Fig. 9 is an exploded view of one of the side anvil assemblies of the carriage.

Fig. 9 shows one of the side anvil assemblies 50 which is adapted to be removably mounted in the recess 46 at one side of the anvil carriage block. This anvil assembly includes an anvil member designated generally at 58. This member includes an end 59 adapted to fit the inner surfaces of recess 46 to prevent relative vertical or rotary movement with respect to the recess and carriage block when the parts are assembled. Member 58 also includes an upper surface 60 which in this case is shown as a notched surface adapted to receive and support the leads of the desired electrical component. Finally, the anvil member includes an outer side surface 62 shaped to correspond to the desired curvature of the component leads. Thus the anvil member 58 is adapted both to support the component and to provide an anvil surface against which the finger 18 of the forming head can press the component lead 22.

The side anvil assembly 50 also includes a body and wing guide member 64, which has one end 65 adapted to fit the inner surface of recess 46. The body guide 64 also includes a projecting support 66 adapted to fit beneath the lead 22 of the component 26 at a point immediately adjacent one end of the body of the component. Thus member 64 not only provides additional support for the component and its lead, but insures the desired lateral location of the component prior to the bending operation.

The side anvil assembly 50 may also include one or more spacers 68 and 70, adapted to fit within the recess 46 in the relative location shown in Fig. 9. Spacer 68 provides the desired spacing between the anvil member 58 and the body guide 64, while spacer 70 insures the desired lateral location of both the anvil member 58 and body guide 64 with respect to the main body of the carriage block 44.

According to the present invention the anvil side assembly includes means by which the relative lateral location of the parts may be readily adjusted when components of different sizes and different desired lead spacings are to be formed. In the present case the readily operable means for adjusting these locations includes the spacers 68 and 70 and removable screws or bolts 72 adapted to pass through aligned openings in the members 58, 68, 64, and 70 and secure these members to the carriage block 44 within recess 46.

Figure 10:
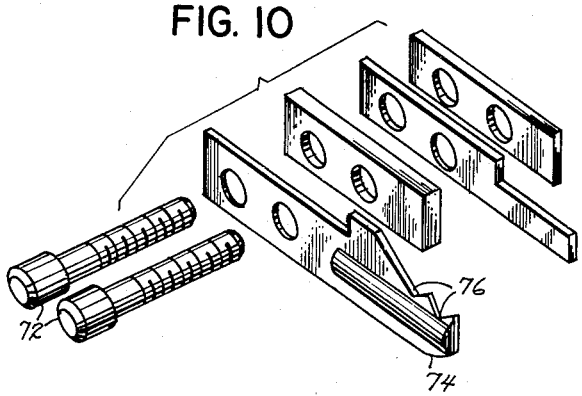
Fig. 10 is a view similar to Fig. 9 of a modified side anvil assembly adapted to receive a different type or size of component.

As shown in Fig. 10, one or more of the elements of the side anvil assembly may be replaced with a differently dimensioned component in order to accommodate different desired lead shapes. In Fig. 10, for example, the anvil member 58 has been replaced by an anvil member 74 which has a pair of supporting notches or surfaces 76 in its upper surface. These notches are adapted to engage and support the multiple leads of a component which has two projecting leads at this particular end. Obviously the spacer blocks can also be omitted, or can be replaced by spacer blocks of different size or number in order to change the relative lateral locations of the anvil member and the body guide member.

Figure 6:
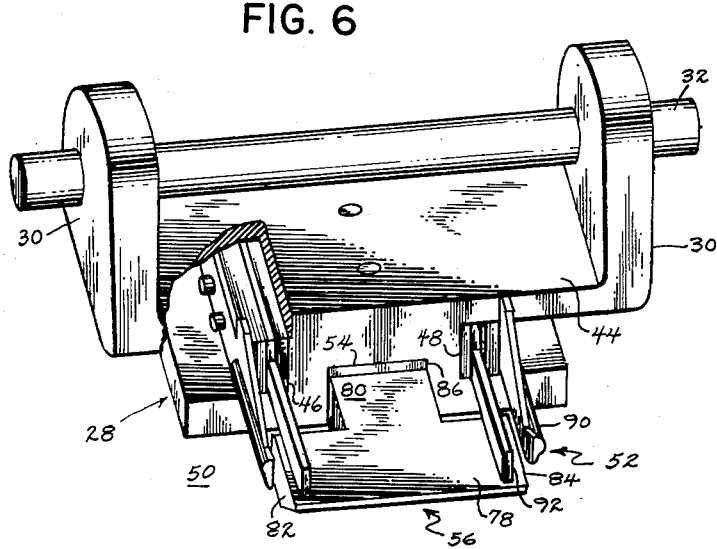
Fig. 6 is a partial perspective view of the anvil carriage assembly showing details of construction.

The second side anvil assembly 52 is essentially similar in construction. As shown in Figs. 5 and 6, it includes an anvil member 90 and a body guide 92 with suitable spacers. Thus one or both of the side anvil assemblies may be removed and its elements interchanged in order to provide means for adjusting the relative lateral positions of the body and wing guides to accommodate different component body lengths or of the anvil members to accommodate different desired bending points for the leads.

Figure 7:
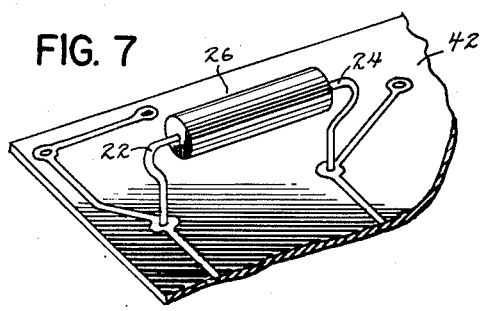
Fig. 7 is a partial perspective view of the completely formed component inserted in a printed circuit board.
Figure 8:
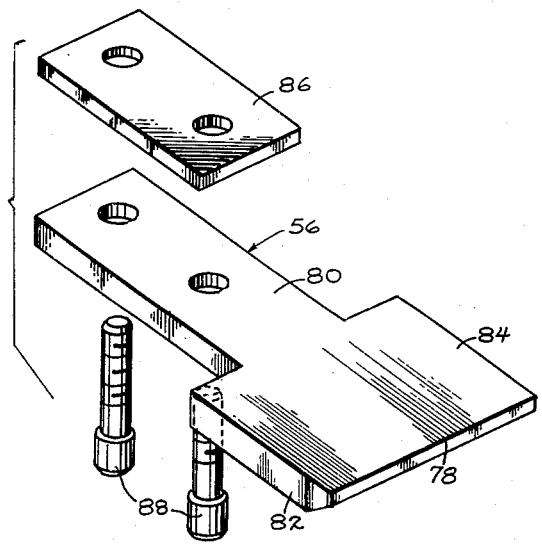
Fig. 8 is an exploded view of the wire guide assembly which forms part of the anvil carriage.

With reference to Figs. 6 and 8, the wire guide assembly 56 is adapted for removable attachment to block 44 within the bottom recess 54. This wire guide assembly includes a wire guide plate 78 having a portion 80 adapted to fit the dimensions of recess 54 and prevent relative movement when the guide plate is secured in the recess. This guide plate has spaced lateral edges 82 and 84 which effectively determine the spacing of the wire leads of the component after those leads have been bent around the anvil members. As shown in Fig. 5, the wire guide member is mounted below and between the side anvil members. Thus, fingers 18 and 20 of the forming head bend the leads of the component around the anvil members and back toward each other until they engage the edges of the wire guide plate. The guide plate thus determines the final spacing between the leads and insures that these leads will accurately fit the desired circuit board openings as shown in Fig. 7. The wire guide assembly may also include one or more spacers 86 adapted to fit between the portion 80 of the guide plate and the upper surface of recess 54 of the carriage block. Bolts or screws 88 provide a readily operable means for removal of the wire guide assembly and for adjustment of the relative vertical position of the guide plate 78 by omission or change in the number or thickness of spacers 86.

According to the foregoing description an adjustable anvil carriage has been provided which facilitates adjustment of the relative lateral and vertical spacing of the anvil members, the wire guide members, and the body and wing guides. Thus the anvil carriage assembly of the present invention may be used for the handling of a large variety of sizes and shapes of different electrical components with a minimum of readjustment required for accommodation of the machine to the different dimensions needed. Since minor variations and changes in the exact details of construction will be apparent to persons skilled in this field, it is intended that this invention shall cover all such changes and modifications as fall within the spirit and scope of the foregoing description and the attached claims.

Now therefore I claim:

1. In a component forming and inserting machine having a forming head with fingers adapted to engage and bend the leads of an electrical component, including in combination an adjustable anvil carriage assembly to receive and support the components and guide the bending of said leads by said fingers, said anvil carriage assembly comprising a carriage block, first and second side anvil assemblies mounted at the respective sides of said block, each of said side assemblies including an anvil member having a top surface adapted to receive and support the leads of a component and an outer side surface defining the path around which the leads are to be bent, a wire guide plate mounted on said block and projecting below and between the anvil members, said plate having spaced lateral edges which limit the inward bending of said leads around the anvil members and thus determine the final spacing between said leads, and readily operable means removably mounting said plate on said block and thereby facilitating substitution of a guide plate of different width for components whose leads require a different final spacing.

2. In a component forming and inserting machine having a forming head with fingers adapted to engage and bend the leads of an electrical component, the combination including an adjustable anvil carriage assembly to receive and support the components and guide the bending of said leads by said fingers, said anvil carriage assembly comprising a body member having a recess in each side to provide an I-shaped cross section, a pair of anvil members, one for each recess, each anvil member having one end adapted to fit within its recess and a second end having an upper component lead supporting surface and an outer side surface defining the path around which the leads are to be bent, a third recess in the lower surface of said body, a wire guide plate having one end adapted to fit said third recess and another end providing spaced edges defining the ultimate desired spacing between the component leads, said spaced edges being located between and lower than the anvil members when the guide plate is in its recess, means for removably mounting each anvil in its corresponding recess, the lateral depth of each recess corresponding to a desired range of different spacings between the anvil members, and means for removably mounting the guide plate in said third recess.

3. A machine according to claim 1 having a component body guide located between each anvil member and said carriage block, said body guides being spaced from each other by a distance just slightly greater than the component length and thereby adapted to locate the component laterally of the anvil assembly.

4. A machine according to claim 3 in which each body guide is held in position by the same readily operable means by which the corresponding anvil member is removably mounted on the block.

References Cited in the file of this patent

UNITED STATES PATENTS

| | | |
|---|---|---|
| 2,635,234 | Reed | Apr. 21, 1953 |
| 2,705,797 | Handel | Apr. 12, 1955 |